April 7, 1970 GERHARD-GUNTER GASSMANN 3,505,468
TELEVISION DEMODULATION SYSTEM
Filed Oct. 31, 1966
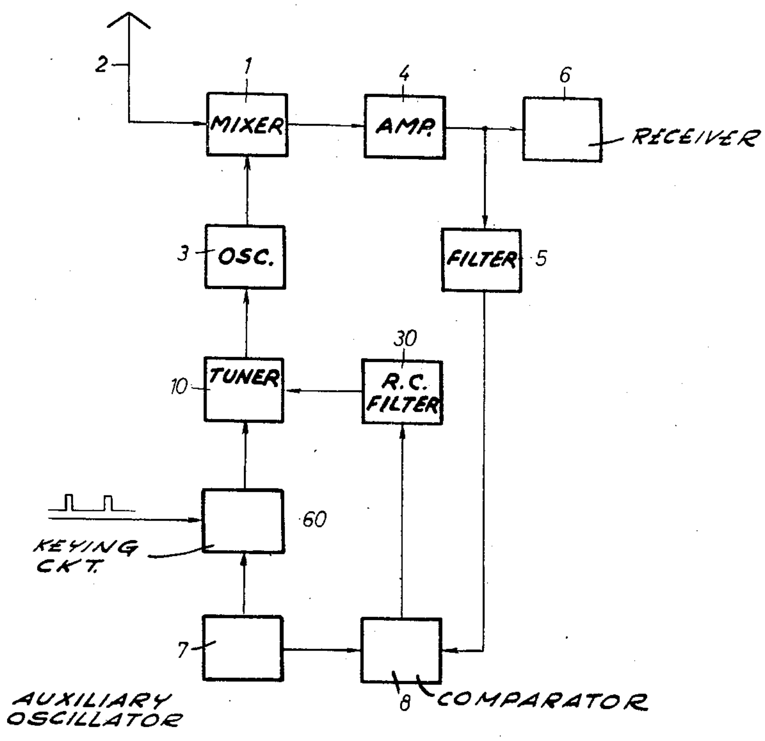
INVENTOR
GERHARD G. GASSMANN
BY Menotti J. Lombardi Jr.
ATTORNEY

United States Patent Office 3,505,468
Patented Apr. 7, 1970

3,505,468

TELEVISION DEMODULATION SYSTEM

Gerhard-Gunter Gassmann, Berkheim, Germany, assignor to International Standard Electric Corporation, New York, N.Y., a corporation of Delaware

Filed Oct. 31, 1966, Ser. No. 590,594
Claims priority, application Germany, Nov. 9, 1965, St 24,615
Int. Cl. H04n *3/16*
U.S. Cl. 178—7.3 1 Claim

ABSTRACT OF THE DISCLOSURE

A method for reception of video signals wherein the incoming signal is demodulated during the period of line flyback, by a locally generated signal of the same frequency and phase as the carrier of the incoming signal, said locally generated signal in turn being modulated by a locally generated auxiliary oscillator. The output of the demodulator is filtered to recover the remnant auxiliary signal which is in turn compared with the original auxiliary signal to provide a controlled signal for controlling the aforesaid locally generated signal.

U.S. Patent No. 3,454,710, entitled Synchronous Demodulator System, issued July 8, 1969 to G. G. Gassmann and assigned to the assignee of the present invention.

The patent describes a method in which the received signal is, via a mixer with mixer oscillator, led to an amplifier (e.g. a low-frequency amplifier or a video amplifier) and in which at the correct tuning, the frequency of the mixer oscillator is equal to the carrier frequency of the received signal, or where the mixer oscillator is modulated with an auxiliary signal which is compared in a comparator circuit with the auxiliary signal derived from the amplifier, for producing a control voltage to tune the frequency or the phase of the mixer oscillator.

When using this method to receive video signals the auxiliary signal may interfere with the picture. This interference can be eliminated, at least partially, in a way well known in the art, e.g. with the aid of series-tuned wave traps or the like.

It is the object of the present invention to obtain a picture completely undisturbed by the auxiliary signal without the application of such auxiliary measures. In a method in which the received signal is led, via at least a mixer with mixer oscillator, to an amplifier (e.g. low-frequency or video amplifier) and in which at the correct tuning the frequency of the mixer oscillator is equal to the carrier frequency of the received signal and in which, according to the aforesaid U.S. patent the received signal or the mixer oscillator is modulated with an auxiliary signal which is compared, for producing a control voltage to tune the frequency or the phase of the mixer oscillator respectively, in a comparing circuit with the auxiliary signal derived from the amplifier. According to the present invention the aforementioned drawback is avoided in that, when receiving video signals, the auxiliary signal is applied only during the line flyback.

The invention is explained in detail with the aid of the preferred embodiment shown in the accompanying drawing.

In this drawing 1 represents the mixer to which is led the received signal from the antenna 2. 3 is the mixer oscillator to be synchronized. 4 is the amplifier (e.g. low-frequency or video amplifier) succeeding the mixer, 5 represents a filter with the aid of which the auxiliary signal leaving the amplifier 4 is derived. 6 is the final signal receiver, e.g. a loudspeaker or a picture tube. 7 is the auxiliary oscillator producing the auxiliary signal. 8 represents the reference or comparing circuit which receives the auxiliary signal regained with the aid of filter 5 and the auxiliary signal arriving from the oscillator 7. A control voltage is derived from the reference circuit 8, filtered out with the RC element 30 said filtered control voltage vernier-tuning the mixer oscillator 3 with the aid of the vernier tuning device 10. For phase modulation of the mixer oscillator 3 the vernier tuning device 10 receives in addition the auxiliary signal from the oscillator 7. According to the invention, this auxiliary signal is, however, not led directly to the vernier tuning device 10, but va a keyed circuit arrangement 60. This keyed circuit arrangement is controlled by pulses, derived e.g. from the line transformer, their duration coinciding with the line flyback on the screen. The keyed circuit arrangement 60 may be omitted if the auxiliary oscillator 7 is actuated directly by the line flyback pulses in such a way that it renders oscillations only during these pulses.

What is claimed is:

1. A method of receiving video signals modulated on a carrier comprising the steps of:
- locally generating a signal of the same frequency as the carrier of the incoming signal;
- modulating the locally generated signal with an auxiliary signal;
- mixing the incoming signal with said modulated locally generated signal during the period of line flyback to cancel out the carrier frequency of said incoming signal, leaving solely a remnant auxiliary signal and the intelligence signal of the incoming signal;
- separating said remnant auxiliary signal from the intelligence signal;
- comparing the remnant auxiliary signal and the original auxiliary signal to provide a control signal proportional to the difference between said auxiliary and remnant auxiliary signal; and
- controlling the frequency and phase of said locally generated signal with said control signal.

References Cited

UNITED STATES PATENTS

| | | | |
|---|---|---|---|
| 3,057,954 | 10/1962 | Harling et al. | 178—7.3 |
| 3,144,512 | 8/1964 | McAllan et al. | 178—7.3 |

JOHN W. CALDWELL, Primary Examiner

R. L. RICHARDSON, Assistant Examiner

U.S. Cl. X.R.

325—444; 329—50, 122, 153